(12) United States Patent
Matsuoka

(10) Patent No.: US 10,397,473 B2
(45) Date of Patent: *Aug. 27, 2019

(54) IMAGE PROCESSING APPARATUS HAVING AN IMAGE SYNTHESIS UNIT THAT GENERATES SYNTHESIZED IMAGE DATA DEPENDING ON AN OBJECT BRIGHTNESS, AND RELATED IMAGE-PICKUP APPARATUS

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,104

(22) Filed: Apr. 25, 2017

(65) Prior Publication Data

US 2017/0230571 A1    Aug. 10, 2017

Related U.S. Application Data

(62) Division of application No. 14/845,624, filed on Sep. 4, 2015, now Pat. No. 9,667,882.

(30) Foreign Application Priority Data

Sep. 12, 2014   (JP) .................................. 2014-185864

(51) Int. Cl.
*H04N 5/232* (2006.01)
*H04N 5/235* (2006.01)
(Continued)

(52) U.S. Cl.
CPC ....... *H04N 5/23232* (2013.01); *H04N 5/2351* (2013.01); *H04N 5/2355* (2013.01);
(Continued)

(58) Field of Classification Search
CPC ... H04N 5/3572; H04N 5/23232; H04N 5/345
See application file for complete search history.

(56) References Cited

U.S. PATENT DOCUMENTS 8,854,529 B2    10/2014  Yoshimura et al.
9,369,693 B2 *  6/2016   Kurahashi .............. H04N 13/02
(Continued)

FOREIGN PATENT DOCUMENTS

JP      2002-199284 A    7/2002
JP      WO2009/113701 A1  9/2009
(Continued)

*Primary Examiner* — Cynthia Segura
(74) *Attorney, Agent, or Firm* — Venable LLP

(57) ABSTRACT

An image processing apparatus includes a memory that stores instructions, and one or more processors that execute the instructions to cause the image processing apparatus to function as, among other things, an image synthesis unit configured to synthesize first image data acquired by a first acquisition unit and second image data acquired by a second acquisition unit based on an object brightness, so that the first image data is selected in an area in which the object brightness is a first value that is greater than a threshold value, and the second image data is selected in an area in which the object brightness is a second value that is less than the threshold value, and to generate synthesized image data of the first image data and the second image data.

10 Claims, 8 Drawing Sheets

(51) Int. Cl.
*H04N 5/265* (2006.01)
*H04N 5/357* (2011.01)
*H04N 5/345* (2011.01)

(52) U.S. Cl.
CPC ............ *H04N 5/265* (2013.01); *H04N 5/345* (2013.01); *H04N 5/3572* (2013.01)

(56) References Cited

U.S. PATENT DOCUMENTS

| | | | |
|---|---|---|---|
| 9,426,382 B2 * | 8/2016 | Matsuoka | H04N 5/23254 |
| 9,699,387 B2 * | 7/2017 | Matsuoka | H04N 5/2355 |
| 2007/0040100 A1 * | 2/2007 | Zarnowski | H01L 27/14603 |
| | | | 250/208.1 |
| 2008/0143858 A1 | 6/2008 | Kusaka | |
| 2009/0090841 A1 | 4/2009 | Kusaka | |
| 2012/0300104 A1 * | 11/2012 | Onuki | H04N 5/23212 |
| | | | 348/302 |
| 2013/0083225 A1 * | 4/2013 | Minowa | H01L 27/14607 |
| | | | 348/294 |
| 2013/0216199 A1 | 8/2013 | Nakajima | |
| 2013/0229555 A1 | 9/2013 | Hashimoto et al. | |
| 2013/0235253 A1 | 9/2013 | Onuki et al. | |
| 2014/0146218 A1 * | 5/2014 | Kunieda | H04N 5/23212 |
| | | | 348/345 |
| 2014/0204178 A1 * | 7/2014 | Kawai | G03B 35/08 |
| | | | 348/46 |
| 2015/0002838 A1 | 1/2015 | Fukuda et al. | |
| 2015/0009383 A1 * | 1/2015 | Fujii | H04N 5/347 |
| | | | 348/302 |
| 2015/0062394 A1 | 3/2015 | Ikeda et al. | |
| 2015/0281540 A1 * | 10/2015 | Matsuoka | H04N 5/2355 |
| | | | 348/362 |
| 2015/0381883 A1 | 12/2015 | Kawai et al. | |
| 2016/0264255 A1 | 9/2016 | Connor et al. | |
| 2016/0309102 A1 * | 10/2016 | Koizumi | H04N 5/3696 |
| 2016/0316158 A1 | 10/2016 | Uchida | |
| 2017/0244915 A1 * | 8/2017 | Yamazaki | H01L 27/14605 |

FOREIGN PATENT DOCUMENTS

| | | | | |
|---|---|---|---|---|
| JP | WO2013/027513 A1 | 2/2013 | | |
| JP | WO 2013027513 A1 * | 2/2013 | ............ | G03B 35/08 |
| JP | 2013-125095 A | 6/2013 | | |

* cited by examiner

IMAGE PROCESSING APPARATUS HAVING AN IMAGE SYNTHESIS UNIT THAT GENERATES SYNTHESIZED IMAGE DATA DEPENDING ON AN OBJECT BRIGHTNESS, AND RELATED IMAGE-PICKUP APPARATUS

This application is a divisional of U.S. patent application Ser. No. 14/845,624, filed on Sep. 4, 2015, which claims the benefit of Japanese Patent Application No. 2014-185864, filed on Sep. 12, 2014, both of which are hereby incorporated by reference wherein in their entireties.

BACKGROUND OF THE INVENTION

Field of the Invention

The present invention relates to an image processing apparatus that generates a synthesized image of an input image obtained from an image sensor including a pixel usable in image pickup and focus detection.

Description of the Related Art

Examples of conventional dynamic range extension methods using pupil division images include a technique disclosed in Japanese Patent Laid-open No. 2002-199284 for acquiring a plurality of images captured at different exposures with different cumulative times or readout gains by different divided photoelectric converters and synthesizing the images to achieve a dynamic range extension. In a dynamic range extension mode disclosed in Japanese Patent Laid-open No. 2002-199284, configuring the divided photoelectric converters to independently output images enables non-additive readout of two images from the photoelectric converters captured with different cumulative times, followed by synthesis of the images at a signal processor.

Japanese Patent Laid-open No. 2013-125095 discloses, in a description of the concept of pupil division at an image sensor, that a pupil intensity distribution differs for each pupil division image.

In the technique disclosed in Japanese Patent Laid-open No. 2002-199284, however, a more largely extended dynamic range requires a larger cumulative time difference or a larger readout gain difference. The larger cumulative time difference results in different degrees of hand shake between images, leading to an unnatural synthesized image including regions with and without visible blur due to hand shake. The larger readout gain difference results in different degrees of noise between images, leading to an unnatural synthesized image including regions with and without visible noise. Thus, in both cases, an unnatural image including regions with and without visible image degradation is generated.

When the two images captured at different exposures, as described in Japanese Patent Laid-open No. 2002-199284, are provided with a shading correction based on the pupil intensity distribution, as disclosed in Japanese Patent Laid-open No. 2013-125095, a large shading contrast-unevenness level difference requires multiplication with a large shading correction gain, resulting in noise degradation. This will be described later in detail.

SUMMARY OF THE INVENTION

The present invention provides an image processing apparatus that has an advantage in performing a dynamic range extension using pupil division images.

In one aspect, the present invention provides an image processing apparatus that includes a first acquirer configured to acquire first image data, of one of a first pixel and a second pixel that share a single micro lens and receive light passing through different pupil area of an optical system, a second acquirer configured to acquire second image data as a sum of image data obtained from the first pixel and image data obtained from and the second pixel, and an image synthesizer configured to synthesize the first image data and the second image data to generate a synthesized image, depending on an object brightness.

Further features and aspects of the present invention will become apparent from the following description of exemplary embodiments with reference to the attached drawings.

DESCRIPTION OF THE EMBODIMENTS

Figure 1:
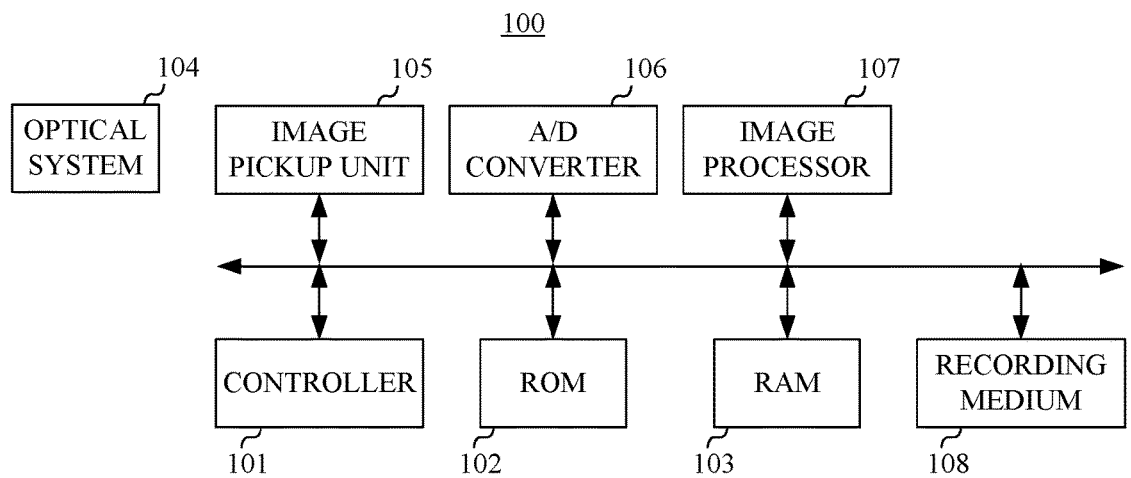
FIG. 1 is a block diagram of a functional configuration of an image-pickup apparatus according to each of the embodiments of the present invention.

Exemplary embodiments of the present invention will be described below with reference to the accompanying drawings. The following embodiments each describe an example of an image processing apparatus of the present invention that is applied to a digital camera (an image-pickup apparatus). FIG. 1 illustrates an example of image processing apparatus that is applied to a lens-integrated image-pickup apparatus, but the present invention is not limited to this application, and is applicable to a lens interchangeable image-pickup apparatus (image pickup system).

Embodiment 1

FIG. 1 is a block diagram of a functional configuration of a digital camera 100 according to each of the embodiments of the present invention. A controller 101 is, for example, a central processing unit (CPU) that reads out an operation program for each component included in the digital camera 100 from a read only memory (ROM) 102 onto a random access memory (RAM) 103 and executes the operation program to control an operation of the component. The ROM 102 is a rewritable non-transitory memory that stores, in addition to the operation program of the component, parameters, and the like, needed for the operation of the component. The RAM 103 is a rewritable transitory memory used as a temporary storage region of data output in the operation of the component.

An optical system 104 forms an object image on an image pickup unit 105. The image pickup unit 105 is, for example, an image sensor, such as one of a charge-coupled device (CCD) and a complementary metal-oxide semiconductor (CMOS) sensor, including a plurality of main pixels disposed under a single micro lens, as disclosed in Japanese Patent Laid-open No. 2013-125095. Each main pixel includes a plurality of sub-pixels that receive, through the single micro lens, light passing through different pupil areas of the optical system 104. Specifically, the main pixel includes at least a first pixel and a second pixel (hereinafter, referred to as "sub-pixels"), that share the single micro lens and receive light passing through the different pupil areas of the optical system 104. In the present embodiment, one main pixel is provided with two sub-pixels, but the present invention is not limited thereto, and each main pixel may have two sub-pixels or more (for example, three or four). In the present invention, an identical shutter speed at image pickup is set for each sub-pixel. The image pickup unit 105 photoelectrically converts an optical image formed through the optical system 104 and outputs a resultant analog image signal to an analog-digital (A/D) converter 106. The A/D converter 106 performs an A/D conversion on an input analog image signal and stores a resultant digital image data on the RAM 103.

An image processor 107 processes image data stored in the RAM 103 to generate an image having an extended dynamic range.

The recording medium 108 is, for example, a detachable memory card that records, as record images, an image stored in the RAM 103 and processed by the image processor 107, and an image provided with an A/D conversion by the A/D converter 106, for example.

Figure 7:
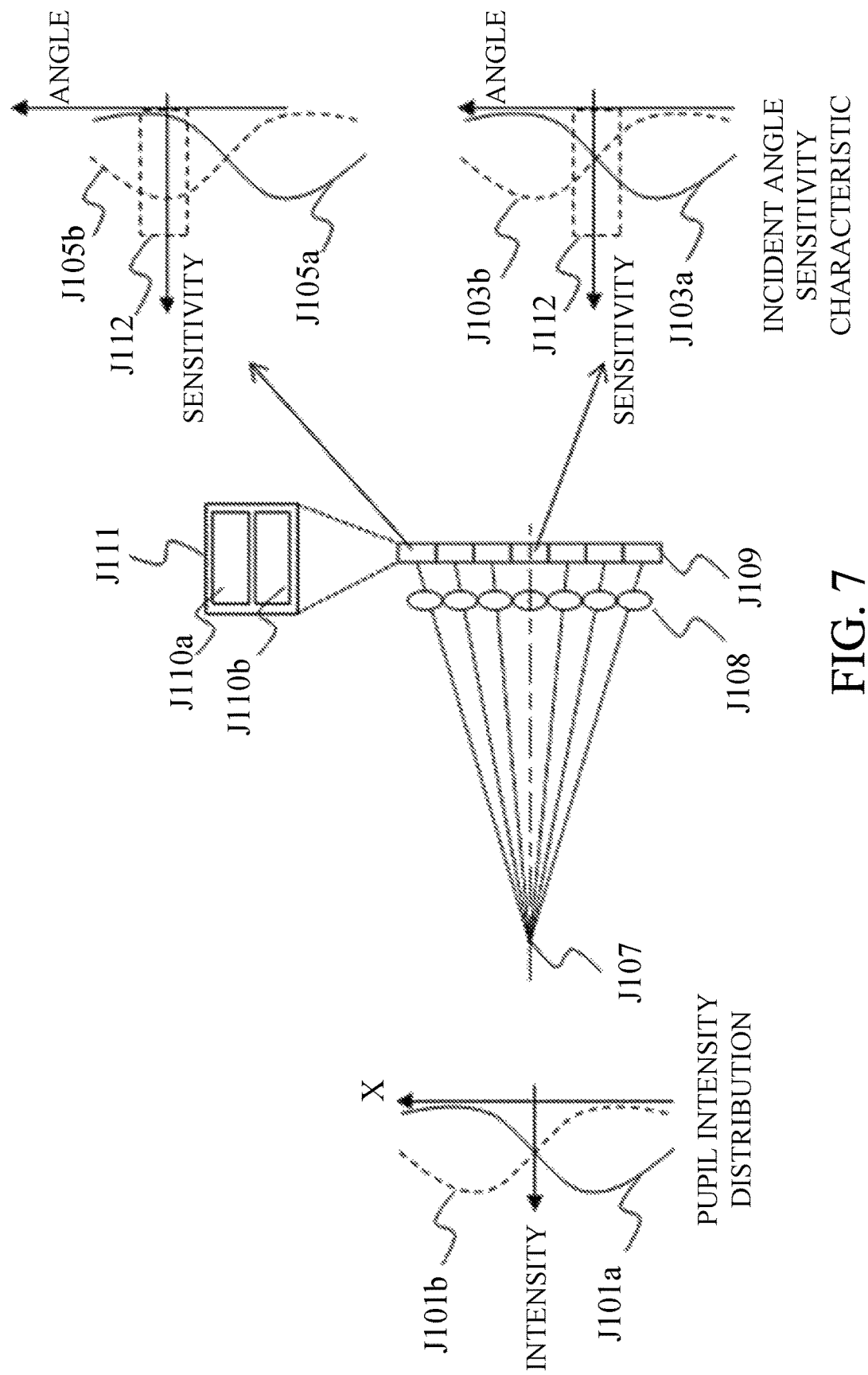
FIG. 7 is an explanatory diagram of a pupil intensity distribution on a sensor pupil surface according to a conventional example and an incident-angle sensitivity characteristic on an image plane of an image sensor (sensor).

Next, a description of a property that a pupil intensity distribution differs between pupil division images obtained from a plurality of sub-pixels, and a shading characteristic based on the property is provided, with reference to a conventional example, and FIGS. 7 to 10. FIG. 7 is an explanatory diagram of the pupil intensity distribution on a sensor pupil surface and an incident-angle sensitivity characteristic on an image plane of the image sensor (sensor).

Reference numeral J107 denotes the sensor pupil surface. Reference numeral J108 denotes a micro lens array, and reference numeral J109 denotes a pixel array, both of which are included in the image sensor. Reference numeral J111 denotes a main pixel including a sub-pixel J110a and a sub-pixel J110b, as disclosed in Japanese Patent Laid-open No. 2013-125095.

As disclosed in Japanese Patent Laid-open No. 2013-125095, due to vignetting of a pupil, the sub-pixel J110a has a pupil intensity distribution J101a, and the sub-pixel J110b has a pupil intensity distribution J101b.

Reference numerals J103a and J103b denote incident-angle sensitivity characteristics at a central part of the image plane that correspond to the pupil intensity distributions J101a and J101b. The sub-pixel J110a has the incident-angle sensitivity characteristic J103a, and the sub-pixel J110b has the incident-angle sensitivity characteristic J103b. Reference numeral J112 denotes an angle range of incident light restricted by, for example, an aperture stop. Light quantities incident on the sub-pixels J110a and J110b are equal to each other on the central part of the image plane.

Reference numerals J105a and J105b denote incident-angle sensitivity characteristics at an edge of the image plane that correspond to the pupil intensity distributions J101a and J101b. The sub-pixel J110a has the incident-angle sensitivity characteristic J105a, and the sub-pixel J110b has the incident-angle sensitivity characteristic J105b. Different imaging positions at the edge of the image plane and the central part of the image plane lead to a decentered profile of the incident-angle sensitivity characteristic at the edge of the image plane relative to the central part of the image plane. Thus, at the edge of the image plane, in the case illustrated in FIG. 7, a light quantity incident on the sub-pixel J110b is greater than a light quantity incident on the sub-pixel J110a.

Figure 8:
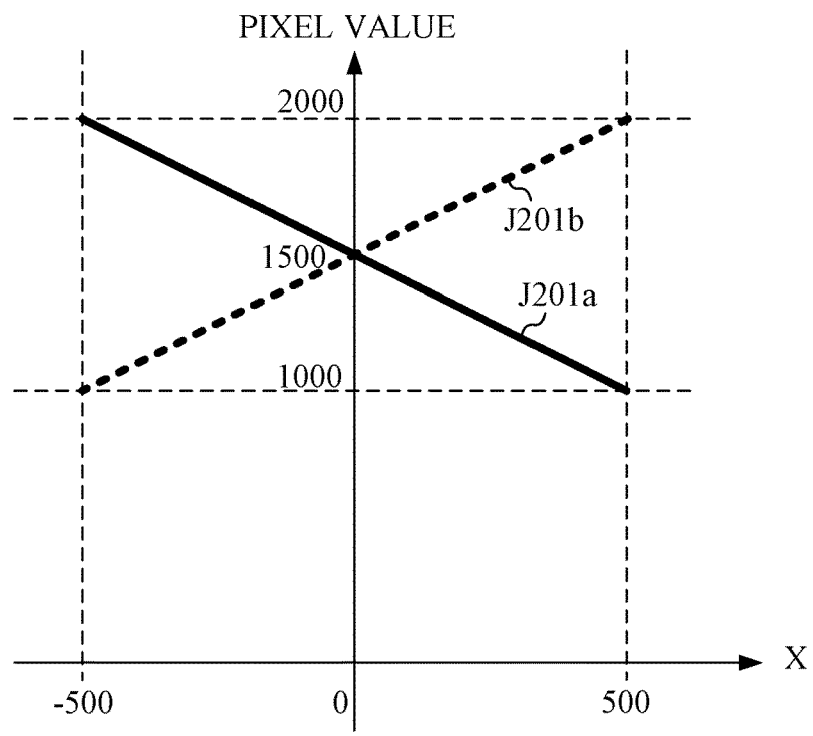
FIG. 8 is an explanatory diagram of a shading characteristic according to the conventional example.

The property described above leads to the shading characteristic in FIG. 8, representing a relation between a pixel position (X) on the image plane and a pixel value. In FIG. 8, reference numeral J201a denotes a shading characteristic of the sub-pixel J110a in FIG. 7, and reference numeral J201b denotes a shading characteristic of the sub-pixel J110b in FIG. 7. The central part of the image plane in FIG. 7 corresponds to a position X=0 in FIG. 8, and the edge of the image plane corresponds to a position X=500.

Figure 9:
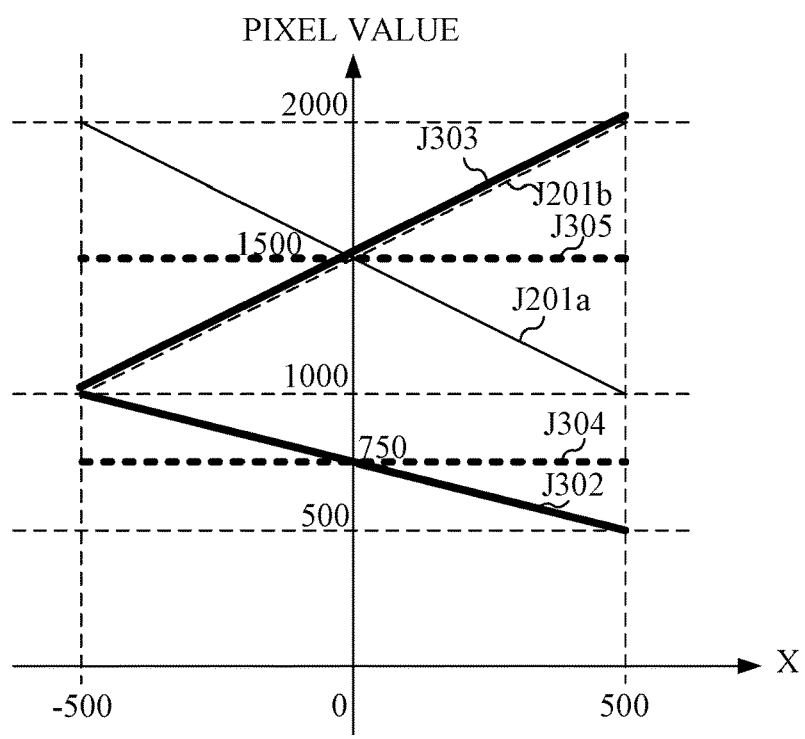
FIG. 9 is an explanatory diagram of acquisition of two images having different exposures according to the conventional example.
Figure 10:
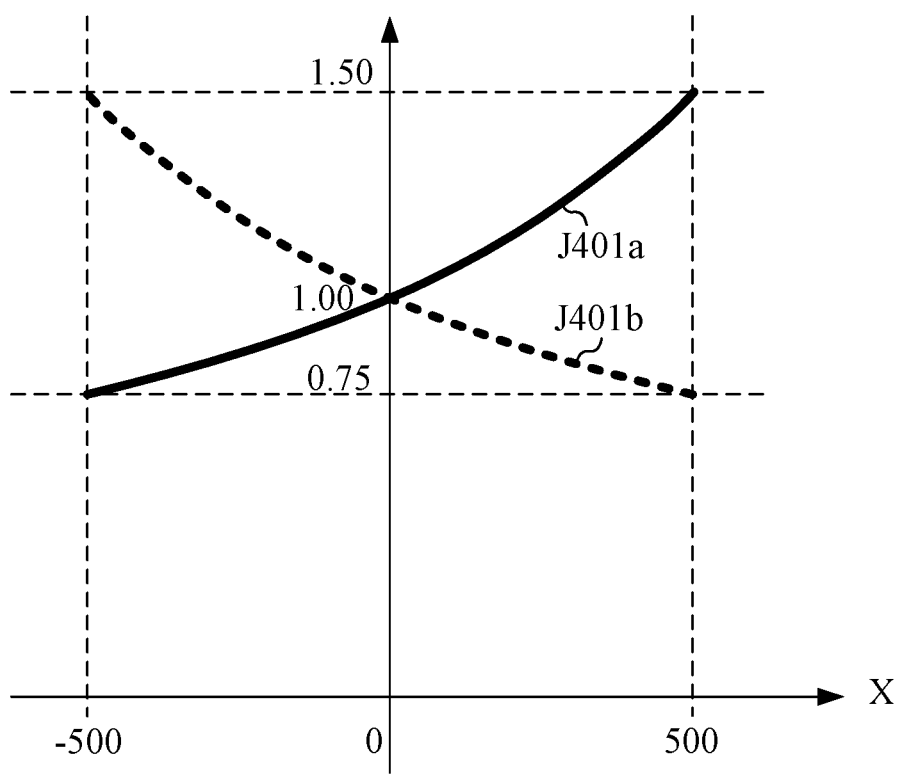
FIG. 10 is an explanatory diagram of a shading correction coefficient according to the conventional example.

FIG. 9 is an explanatory diagram of acquisition of a plurality of images having different exposures for each of different pupil division images acquired by the sub-pixels J110a and J110b in FIG. 7, as disclosed in Japanese Patent Laid-open No. 2002-199284. Reference numeral J303 denotes a pupil division image captured with the sub-pixel J110b being properly exposed, and reference numeral J302 denotes a pupil division image captured with the sub-pixel J110a being underexposed by one level (one exposure value (EV)). A shading correction is made by performing multiplication with inverse characteristics of the shading characteristics in FIG. 8 as shading correction coefficients, and, accordingly, J303 is corrected to J305, and J302 is corrected to J304. The shading correction coefficients are illustrated in FIG. 10, in which reference numeral J401a denotes the shading correction coefficient to the pupil division image captured by the sub-pixel J110a, and reference numeral J401b denotes the shading correction coefficient applied to the pupil division image captured by the sub-pixel J110b. Consequently, J305 is acquired as a proper exposure image, and J304 is acquired as an underexposure image, whereby the images have an exposure difference by one level (one EV) on the entire image plane. The shading correction performed on the different pupil division images in this manner allows a following image synthesis to achieve an extended dynamic range.

Next, a configuration and an operation of the image processor 107 in FIG. 1 in an embodiment of the present invention will be described with reference to FIGS. 2 to 4.

Figure 4:
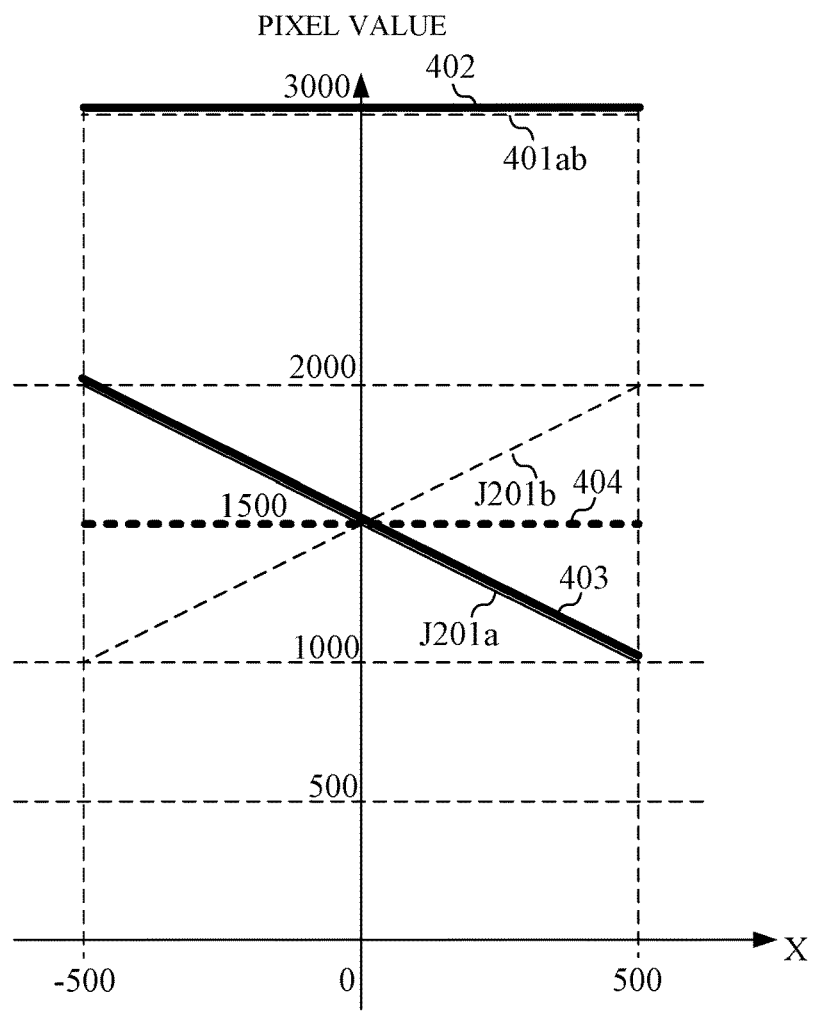
FIG. 4 is an explanatory diagram of an operation of an image processing unit according to Embodiment 1 of the present invention.

FIG. 4 is an explanatory diagram of a procedure of acquiring images having two different exposures in a first embodiment of the present invention, in which a horizontal axis represents the pixel position (X) and a vertical axis represents the pixel value. Reference numeral J201a denotes the pupil division image (image A) captured by the sub-pixel J110a in FIG. 7, reference numeral J201b denotes the pupil division image (image B) captured by the sub-pixel J110b in FIG. 7, and reference numeral 401*ab* denotes an added image (image (A+B)) of the sub-pixel J110*a* and the sub-pixel J110*b* in FIG. 7.

With the use of a non-additive readout mode for a focus detection, disclosed in Japanese Patent Laid-open No. 2002-199284, the image A and the image B having the same exposure can be independently read out from the image pickup unit 105 in FIG. 1 and added together at the image processor 107 to generate the image (A+B) having a higher exposure. Alternatively, the image A and the image (A+B) can be independently read out from the image pickup unit 105 in FIG. 1. Specifically, when the image B is read out after the image A is read out in the non-additive readout mode, issuing no reset of a floating diffusion (FD) region right before the image B is read out allows signals of the image B to be added to signals of the image A when transferred to the FD region. This enables the image (A+B) to be read out in place of the image B. In this manner, the image (A+B), obtained through the pixel-level signal addition, as disclosed in Japanese Patent Laid-open No. 2002-199284, is not affected by any amplifier noise in the addition, thereby providing an image of a high signal-to-noise (S/N) ratio that is unobtainable through addition of images provided with an A/D conversion.

Since the image A is captured with one level lower pixel opening as compared to the image (A+B), a synthesized image of the image A and the image (A+B) that is generated with a dynamic range extension by the image processor 107 in FIG. 1 can have a dynamic range extended by one level. Thus, with the image A J201*a* used as an underexposure image 403 and the image (A+B) 401*ab* used as a proper exposure image 402, a corrected underexposure image 404 is generated through a shading correction on the underexposure image 403. The corrected underexposure image 404 and the proper exposure image 402 are synthesized to achieve a dynamic range extension.

Figure 2:
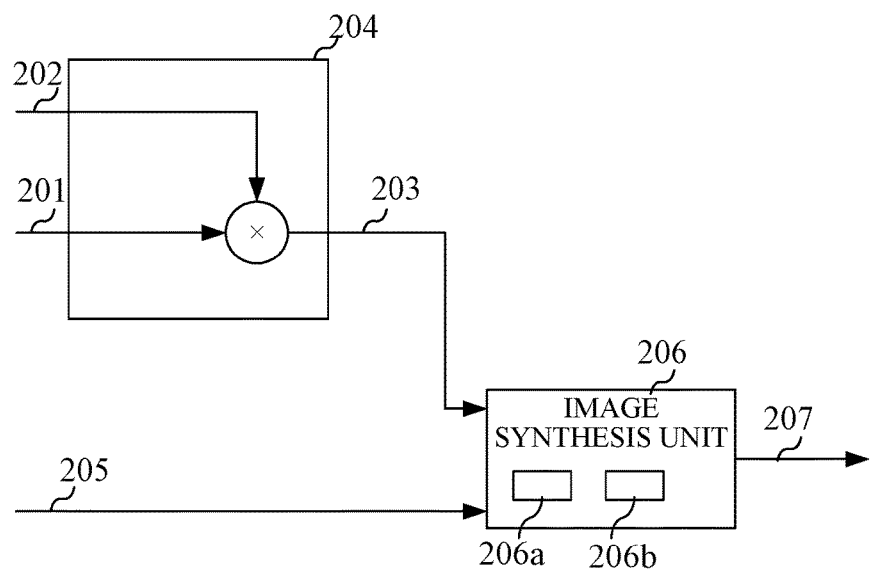
FIG. 2 is an explanatory diagram of a configuration of an image processing unit according to each of the embodiments of the present invention.

FIG. 2 is an explanatory diagram of a configuration of the image processor 107 in FIG. 1.

Reference numeral 204 denotes a shading correction unit (shading corrector) that performs a shading correction (that corrects contrast unevenness due to an uneven vignetting amount across divided pupils) by multiplying the underexposure image 403 (image A) in FIG. 4 with the shading correction coefficient J401*a* in FIG. 10. Reference numeral 201 denotes an underexposure image input unit. The underexposure image input unit (first acquirer) 201 acquires an underexposure image (first image data) from one of the sub-pixels J110*a* and J110*b*. The underexposure image input unit 201 may acquire an underexposure image (third image data) from the other pixel when not acquiring image data from the one of the sub-pixels. Reference numeral 202 denotes a shading correction coefficient input unit. A shading correction coefficient read out from the ROM 102 in FIG. 1 onto the RAM 103 is input through the shading correction input unit 202.

Reference numeral 206 denotes an image synthesis unit that synthesizes the corrected underexposure image 404 and the proper exposure image 402 in FIG. 4 to achieve a dynamic range extension (in other words, to generate a synthesized image having an extended tone expressible range). Reference numeral 203 denotes a corrected underexposure image input unit, and reference numeral 205 denotes a proper exposure image input unit. The proper exposure image input unit (second acquirer) 205 acquires a proper exposure image (second image data) as a sum of image data obtained from the sub-pixel J110*a* and image data obtained from the sub-pixel J110*b*. Reference numeral 207 denotes an extended dynamic range image output unit. The image synthesis unit (image synthesizer) 206 synthesizes the corrected underexposure image 404 (specifically, a gained-up underexposure image described later) and the proper exposure image 402 to generate a synthesized image, depending on an object brightness.

Figure 3:
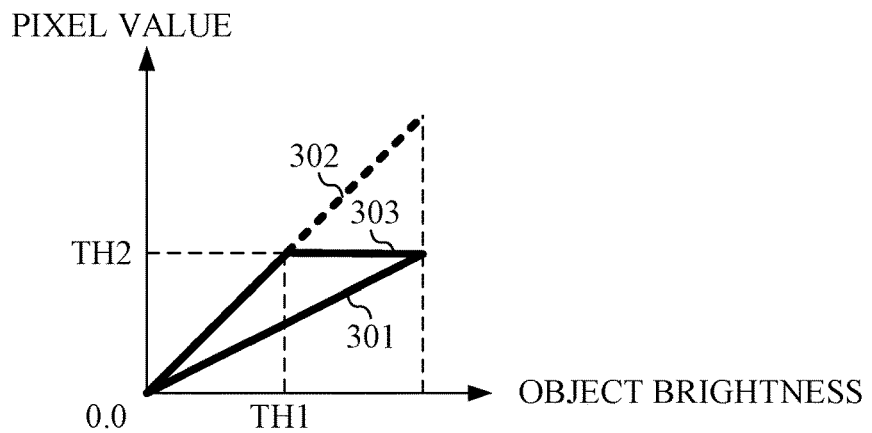
FIG. 3 is an explanatory diagram of an operation of an image synthesizer according to each of the embodiments of the present invention.

FIG. 3 is an explanatory diagram of an operation of the image synthesis unit 206. In FIG. 3, a vertical axis represents the pixel value, and a horizontal axis represents the object brightness. The object brightness may be obtained from, for example, the pixel value of the corrected underexposure image.

Reference numeral 301 denotes a corrected underexposure image, and reference numeral 303 denotes a proper exposure image. Reference numeral TH2 denotes a pixel saturation level to which the pixel value is clipped when an image of a bright object is captured at a proper exposure. Reference numeral TH1 denotes an object brightness corresponding to the saturation level at the proper exposure. Reference numeral 302 denotes a gained-up underexposure image obtained by performing gain-up of the corrected underexposure image 301 by one level. The corrected underexposure image 301, which is underexposed by one level as compared to the proper exposure, can have the same brightness as that of the proper exposure image 303 through the gain-up by one level.

The image synthesis unit 206 includes a determination unit 206*a* (determiner) that determines whether the object brightness at a predetermined pixel position is equal to or greater than the threshold (TH1). The image synthesis unit 206 also includes a selection unit 206*b* (selector) that selects one of the corrected underexposure image 301 or the proper exposure image 303 depending on a determination result of the determination unit 206*a*. Specifically, the selection unit 206*b* selects the proper exposure image 303 when the object brightness is less than the threshold, and selects the corrected underexposure image 301 when the object brightness is equal to or greater than the threshold. Then, the image synthesis unit 206 performs a gain-up of the corrected underexposure image 301 when the corrected underexposure image 301 is selected by the selection unit 206*b*.

The proper exposure image 303 is output at a pixel position at which the object brightness is less than TH1, and the gained-up underexposure image 302 is output at other pixel positions, thereby outputting an image having an extended dynamic range.

Figure 11:
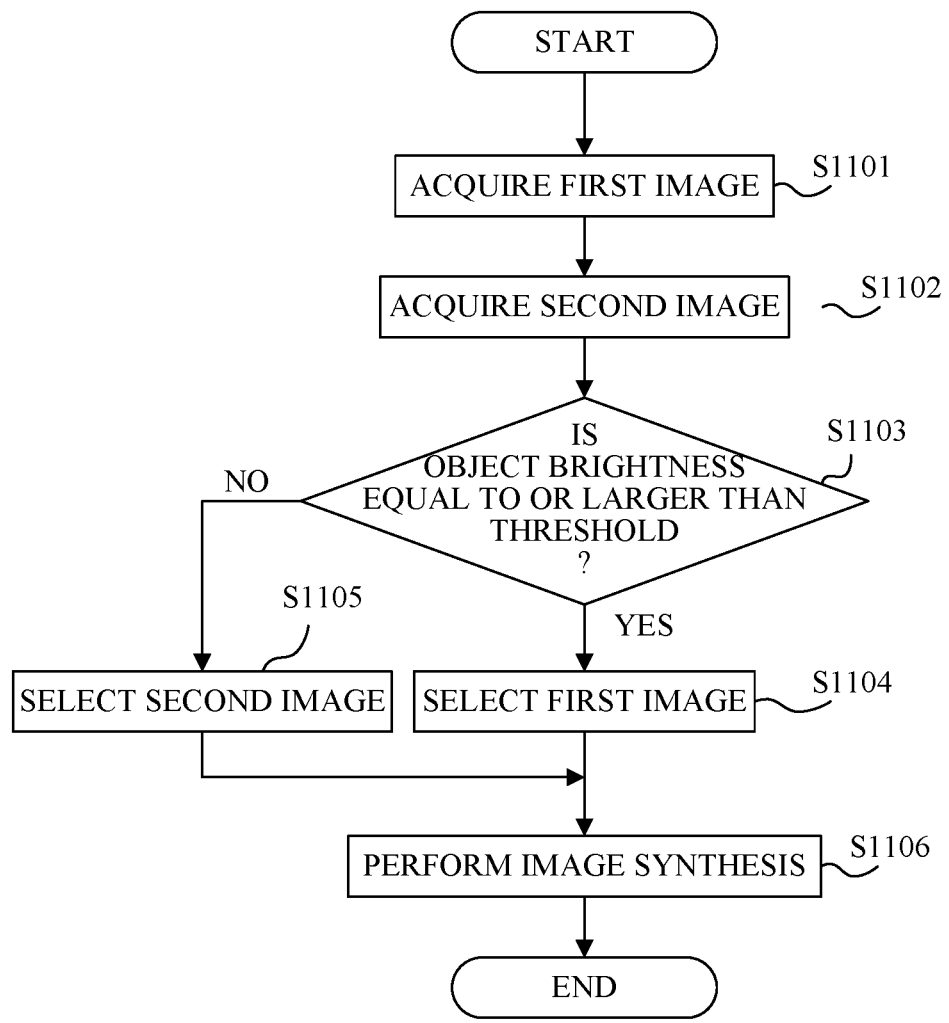
FIG. 11 is a flowchart of the operation of the image synthesizer according to each of the embodiments of the present invention.

Next, the operation of the image synthesis unit 206 according to each of the embodiments of the present invention will be described with reference to a flowchart illustrated in FIG. 11. The flowchart in FIG. 11 illustrates a processing procedure whose processing blocks are controlled and executed by the controller 101 and that is realized by the CPU through readout of the program stored in the ROM 102 onto the RAM 103 and execution of the program.

At step S1101, the image synthesis unit 206 acquires the corrected underexposure image 301 through the corrected underexposure image input unit 203.

At step S1102, the image synthesis unit 206 acquires the proper exposure image 303 through the proper exposure image input unit 205.

At step S1103, the determination unit 206*a* determines whether the object brightness at the predetermined pixel position is equal to or greater than the threshold (TH1). When the object brightness is determined to be equal to or greater than the threshold at step S1103, the flow proceeds to step S1104. When the object brightness is determined to be less than the threshold, the flow proceeds to step S1105.

At step S1104, the selection unit 206b selects the corrected underexposure image 301 among the corrected underexposure image 301 and the proper exposure image 303 that are thus acquired.

At step S1105, the selection unit 206b selects the proper exposure image 303 among the corrected underexposure image 301 and the proper exposure image 303 that are thus acquired.

At step S1106, the image synthesis unit 206 generates a synthesized image based on the image data selected at steps S1104 or S1105. In this step, at a pixel position at which the object brightness is equal to or greater than the threshold (in other words, when the corrected underexposure image 301 is selected by the selection unit 206b), the image synthesis unit 206 performs a gain-up of the corrected underexposure image 301 to generate the gained-up underexposure image 302.

The present embodiment can generate an underexposure image and a proper exposure image without generating a cumulative time difference or a readout gain difference, when a dynamic range extension is achieved by using pupil division images. This prevents generation of an unnatural image including areas with and without visible image degradation. Moreover, no shading correction is required for the proper exposure image, leading to reduction of noise degradation due to a shading correction at a pixel position at which the proper exposure image is selected. Thus, when performing a dynamic range extension by using pupil division images, the present embodiment can prevent generation of a natural image including areas with and without visible image degradation, and simultaneously can achieve a reduction of noise degradation due to a shading correction. Therefore, an image processing apparatus that has an advantage in performing a dynamic range extension using pupil division images can be provided.

Embodiment 2

Next, an image processing apparatus according to a second embodiment of the present invention will be described. The digital camera 100 to which the image processing apparatus according to the present embodiment is applied has the same functional configuration as that of Embodiment 1 illustrated in FIG. 1.

A configuration and operation of the image processor 107 in the present embodiment will be described with reference to FIGS. 2, 3, 5, and 6.

Figure 5:
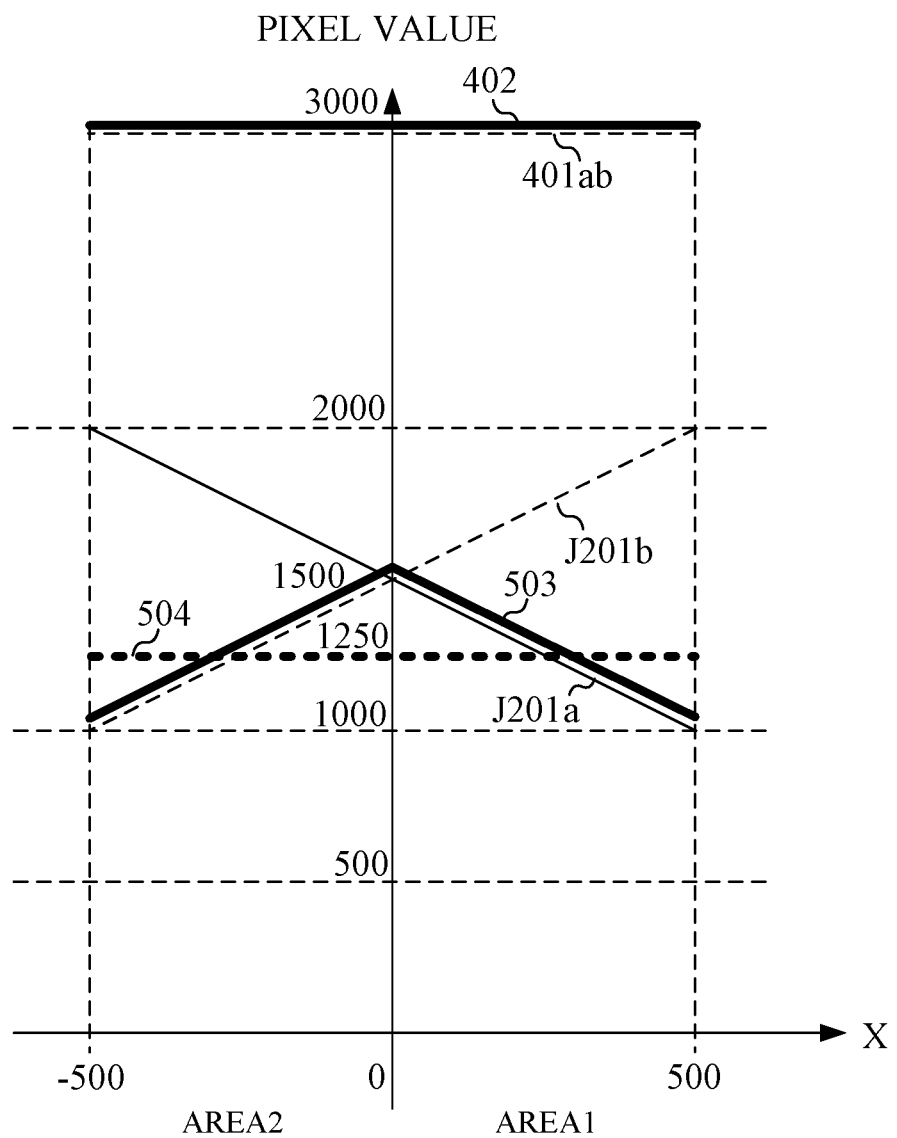
FIG. 5 is an explanatory diagram of an operation of an image processing unit according to Embodiment 2 of the present invention.

FIG. 5 is an explanatory diagram of a procedure of acquiring images having two different exposures according to the second embodiment of the present invention, in which a horizontal axis represents the pixel position (X) and a vertical axis represents the pixel value. Reference numeral J201a denotes the pupil division image (image A) captured by the sub-pixel J110a in FIG. 7, reference numeral J201b denotes the pupil division image (image B) captured by the sub-pixel J110b in FIG. 7, and reference numeral 401ab denotes an added image (image (A+B)) of the sub-pixel J110a and the sub-pixel J110b FIG. 7.

In an area 1 (first image capturing area), similarly to Embodiment 1, the image A J201a and the image (A+B) J401ab are independently read out from the image pickup unit 105. In an area 2 (second image capturing area), the readout starts with the image B J201b in an order different from that of Embodiment 1, thereby independently reading out the image B J201b and the image (A+B) 401ab from the image pickup unit 105. The area 1 and the area 2 are areas obtained by dividing the image plane of the image sensor into two by a line passing through a center of the image sensor (or an optical axis of the optical system). The line passing through the center of the image sensor (or the optical axis of the optical system) is, for example, a line extending in directions (in other words, pupil dividing directions) orthogonal to an arrangement direction of the sub-pixel J110a and the sub-pixel J110b. In other words, the area 1 and the area 2 are areas obtained by dividing an image capturing area of the image sensor in the pupil dividing directions of the sub-pixels. In the area 1, disposed in a first direction as one of the pupil dividing directions with respect to the center of the image sensor (or the optical axis of the optical system), a signal from the sub-pixel J110a disposed in the first direction with respect to a center of the main pixel is read out to acquire the image A J201a. In the area 2, disposed in a second direction opposite to the first direction as one of the pupil dividing directions with respect to the center of the image sensor (or the optical axis of the optical system), a signal from the sub-pixel J110b disposed in the second direction with respect to the center of the main pixel is read out to acquire the image B J201b. As illustrated in FIG. 7, a divided pupil in the area 1 has a large vignetting amount in the image A J201a, and a divided pupil in the area 2 has a large vignetting amount in the image B J201b. In other words, a light quantity incident on the sub-pixel J110b (one of the first and second pixels) is smaller than a light quantity incident on the sub-pixel J110a (the other of the first and second pixels) in the area 1 (first image capturing area), and a light quantity incident on the sub-pixel J110b (the other of the first and second pixels) is less than a light quantity incident on the sub-pixel J110a (the one of the first and second pixels) in the area 2 (second image capturing area).

In the present embodiment, with the image A J201a and the image B J201b selectively used as an underexposure image 503, and the image (A+B) 401ab used as the proper exposure image 402, a corrected underexposure image 504 is generated by performing a shading correction on the underexposure image 503. The corrected underexposure image 504 and the proper exposure image 402 are synthesized to achieve a dynamic range extension.

Figure 6:
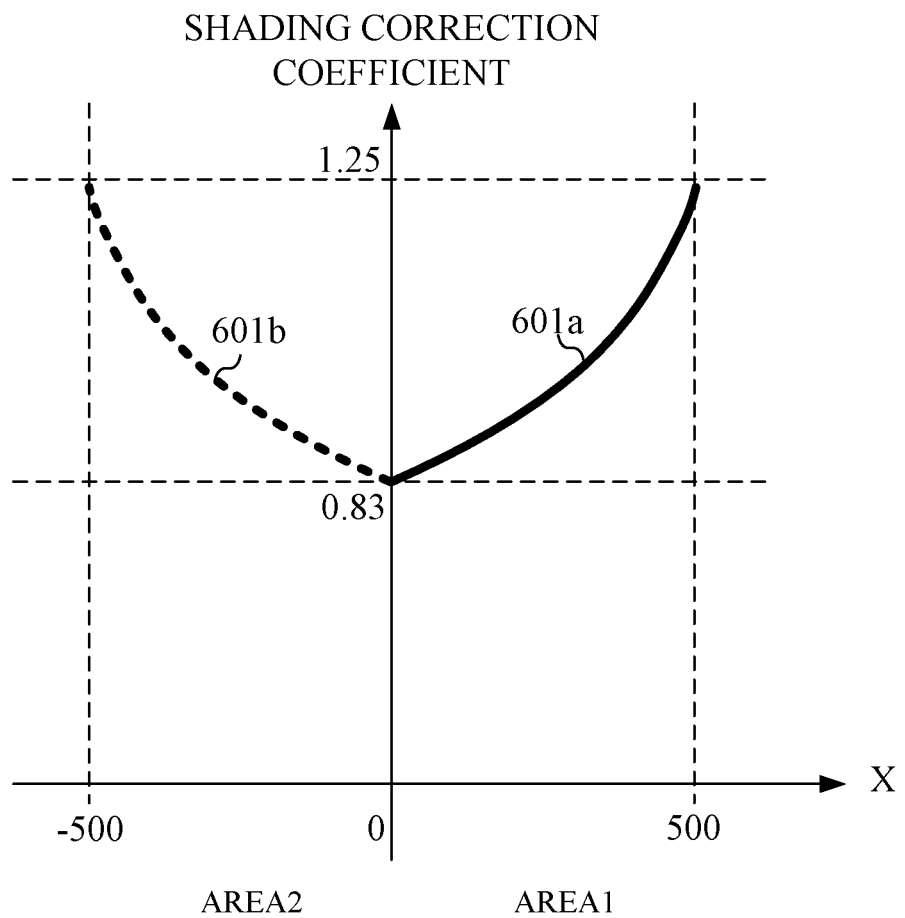
FIG. 6 is an explanatory diagram of a shading correction coefficient according to Embodiment 2.

FIG. 2 is an explanatory diagram of the configuration of the image processor 107, which is the same as that in Embodiment 1. Shading correction coefficients in FIG. 6 are applied, however, to the underexposure image 503 in FIG. 5, with a shading correction coefficient 601a applied in the area 1 and a shading correction coefficient 601b applied in the area 2.

FIG. 3 is the explanatory diagram of the operation of the image synthesis unit 206, which is the same as that in Embodiment 1. Since the corrected underexposure image 504 and the proper exposure image 402 in FIG. 5 have an exposure value difference of 1.26, however, the gained-up underexposure image 302 is obtained by performing a gain-up of the corrected underexposure image 301 by a value of 1.26.

The present embodiment can achieve, with the exposure value difference of 1.26, a dynamic range extension greater than that achievable with the exposure value difference of one level in Embodiment 1. Moreover, a maximum shading contrast-unevenness level difference of 0.68 for the underexposure image 503 in FIG. 5, which is less than the contrast-unevenness level difference of one level for the underexposure image 403 in FIG. 4 in Embodiment 1, achieves a reduction of noise degradation due to a shading correction.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) a memory that stores instructions; and
   (B) one or more processors that execute the instructions to cause the image processing apparatus to function as:
      (a) a first acquisition unit configured to acquire first image data from one of a first pixel and a second pixel, of an image sensor, that share a single micro lens and receive light passing through different pupil areas of an optical system;
      (b) a second acquisition unit configured to acquire second image data as a sum of the first image data obtained from the first pixel and the first image data obtained from the second pixel; and
      (c) an image synthesis unit configured (i) to synthesize the first image data acquired by the first acquisition unit and the second image data acquired by the second acquisition unit based on an object brightness, so that the first image data is selected in an area in which the object brightness is a first value that is greater than a threshold value, and the second image data is selected in an area in which the object brightness is a second value that is less than the threshold value, and (ii) to generate synthesized image data of the first image data and the second image data.

2. The image processing apparatus according to claim 1, wherein the image synthesis unit synthesizes the first image data and the second image data by selecting pixel data from corresponding pixel values of the first image data and the second image data, at each of a plurality of pixel positions.

3. The image processing apparatus according to claim 1, wherein:
   the first acquisition unit is further configured to acquire third image data generated based on a signal obtained from the other of the first pixel and the second pixel of the image sensor, and
   the image synthesis unit is further configured (iii) to select one of the first image data and the second image data in a first image capturing area in a first direction, among pupil dividing directions of the first pixel and the second pixel with respect to an optical axis of the optical system, to generate the synthesized image data of the first image data and the second image data, and (iv) to select one of the third image data and the second image data in a second image capturing area in a second direction, opposite to the first direction, to generate the synthesized image data of the first image data and the third image data, depending on a pixel value indicating the object brightness.

4. The image processing apparatus according to claim 3, wherein:
   a light quantity incident on the one of the first pixel and the second pixel is less than a light quantity incident on the other of the first pixel and the second pixel in the first image capturing area, and
   a light quantity incident on the other of the first pixel and the second pixel is less than a light quantity incident on the one of the first pixel and the second pixel in the second image capturing area.

5. The image processing apparatus according to claim 1, wherein the one or more processors further execute the instructions to cause the image processing apparatus to function as (d) a shading correction unit configured to perform a shading correction on the first image data.

6. The image processing apparatus according to claim 1, wherein the one or more processors further execute the instructions to cause the image processing apparatus to function as:
   (d) a determination unit configured to determine whether a pixel value indicating the object brightness at each pixel position is not less than a threshold value; and
   (e) a selection unit configured to select one of the first image data and the second image data depending on the pixel value determined by the determination unit,
   wherein the image synthesis unit is configured to generate the synthesized image data based on the one of the first image data and the second image data selected by the selection unit.

7. The image processing apparatus according to claim 6, wherein:
   the selection unit selects the second image data when the pixel value indicating the object brightness is less than the threshold value, and selects the first image data when the pixel value indicating the object brightness is not less than the threshold value, and
   the image synthesis unit performs a gain-up of the first image data when the first image data is selected by the selection unit.

8. The image processing apparatus according to claim 1, wherein the image synthesis unit synthesizes the first image data and the second image data to generate the synthesized image data having an extended tone expressible range.

9. An image-pickup apparatus comprising:
   the image processing apparatus according to claim 1; and
   the image sensor.

10. An image processing method comprising the steps of:
    acquiring first image data from one of a first pixel and a second pixel, of an image sensor, that share a single micro lens and receive light passing through different pupil areas of an optical system;

acquiring second image data as a sum of the first image data obtained from the first pixel and the first image data obtained from the second pixel;

synthesizing the first image data and the second image data based on an object brightness, so that the first image data is selected in an area in which the object brightness is a first value that is greater than a threshold value, and the second image data is selected in an area in which the object brightness is a second value that is less than the threshold value; and generating a synthesized image.

* * * * *